United States Patent [19]
Westwick

[11] Patent Number: 5,410,920
[45] Date of Patent: May 2, 1995

[54] APPARATUS FOR INSERTING AND REMOVING A SENSING ELEMENT FROM A FLUID PIPELINE

[75] Inventor: Todd G. Westwick, Boulder, Colo.

[73] Assignee: Veris, Inc., Boulder, Colo.

[21] Appl. No.: 188,538

[22] Filed: Jan. 28, 1994

[51] Int. Cl.6 .............................................. G01F 15/00
[52] U.S. Cl. .................................. 73/866.5; 73/863.85
[58] Field of Search ..................... 73/866.5, 863.85, 86

[56] References Cited

U.S. PATENT DOCUMENTS

| | | |
|---|---|---|
| 3,581,565 | 6/1971 | Dieterich . |
| 4,633,713 | 1/1987 | Mesnard et al. .................. 73/866.5 |
| 4,665,760 | 5/1987 | Eramo et al. . |
| 4,841,787 | 6/1989 | Waterman . |
| 4,951,512 | 8/1990 | Mazza et al. . |
| 5,009,113 | 4/1991 | Kamrat ............................. 73/866.5 |
| 5,036,711 | 8/1991 | Good . |
| 5,106,580 | 4/1992 | Mudiam . |
| 5,138,755 | 8/1992 | Evans et al. ....................... 73/866.5 |
| 5,303,602 | 4/1994 | Morgan ............................. 73/866.5 |

OTHER PUBLICATIONS

Brochure: "Diamond II Annubar Flow Sensors".

*Primary Examiner*—Richard E. Chilcot, Jr.
*Assistant Examiner*—R. Biegel
*Attorney, Agent, or Firm*—Gregg I. Anderson; Holland & Hart

[57] ABSTRACT

An apparatus for inserting and removing a sensor into and from a hot tap on a fluid conveying pipeline includes a pair of parallel threaded drive rods interconnecting a sensor plate and a mounting plate which are operatively connected to the sensor and the hot tap, respectively. The drive rods are interconnected by a sprocket and chain system which rotates the opposite drive rod in reaction to rotation of either drive rod. Load indicators are installed on the drive rods to assist the operator in correctly positioning and loading the sensor in the pressurized pipeline. The drive rods are connected to the sensor plate through moveable threaded sleeves which accommodate irregularities in the drive rod.

12 Claims, 4 Drawing Sheets

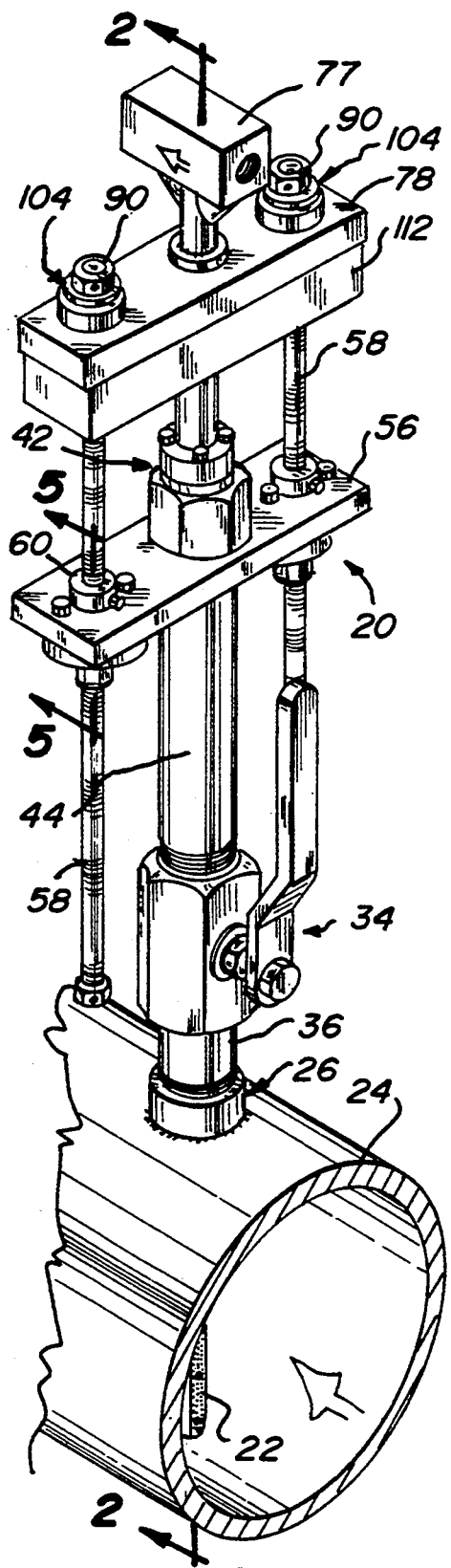
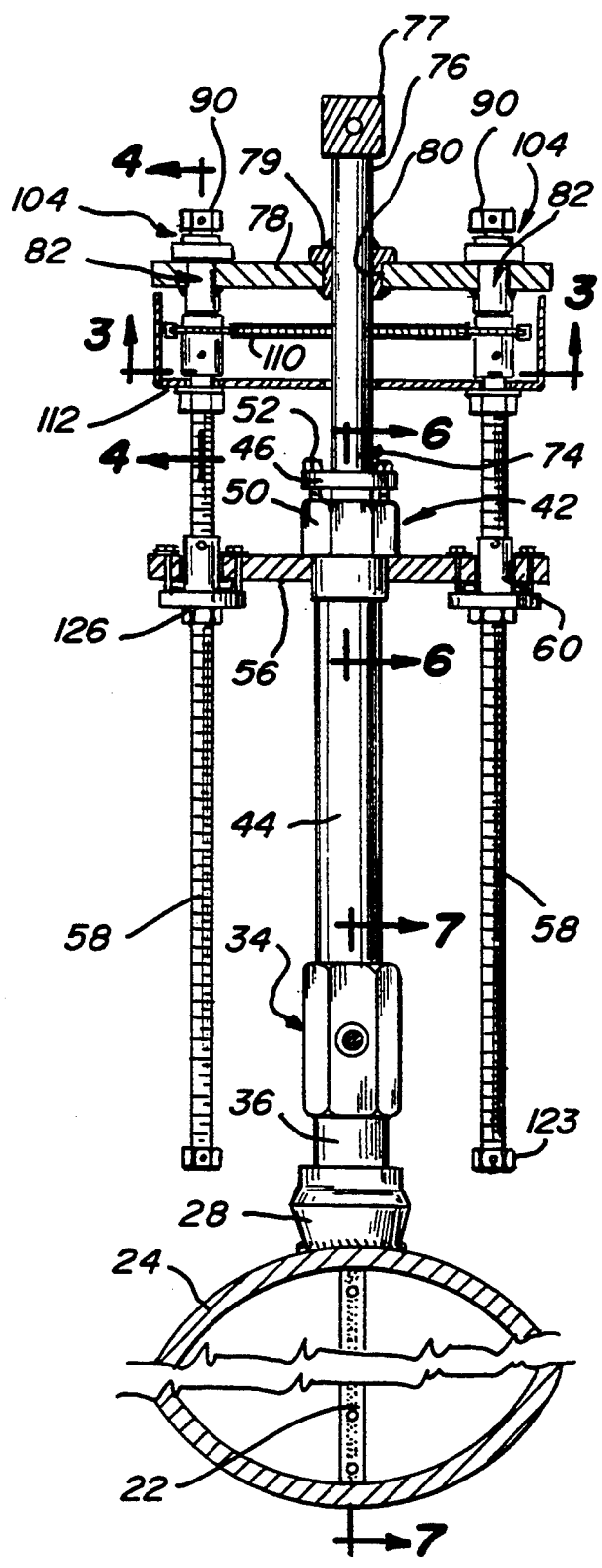
Fig_1   Fig_2

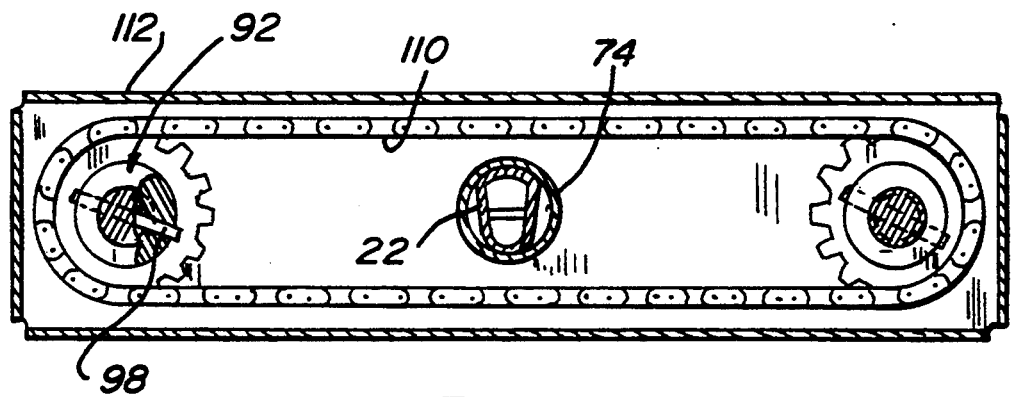
Fig_3
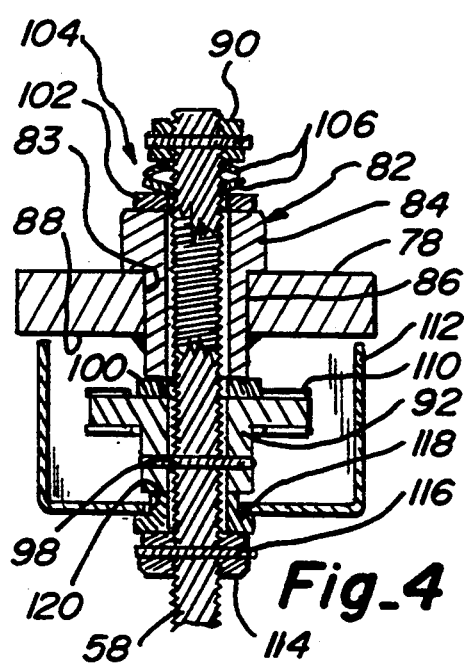
Fig_4
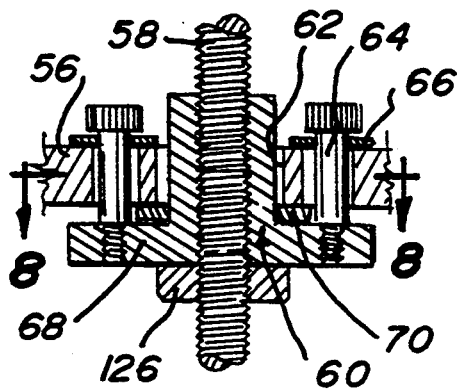
Fig_5
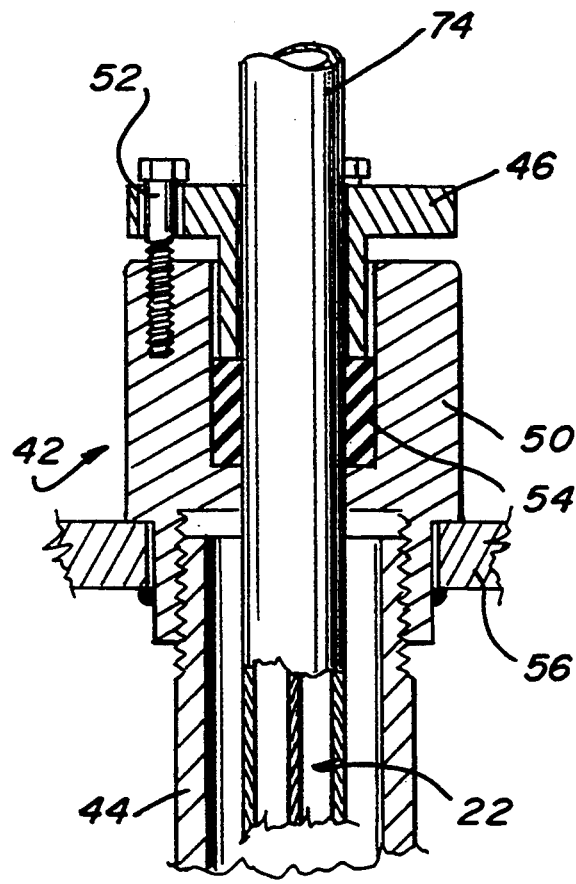
Fig_6

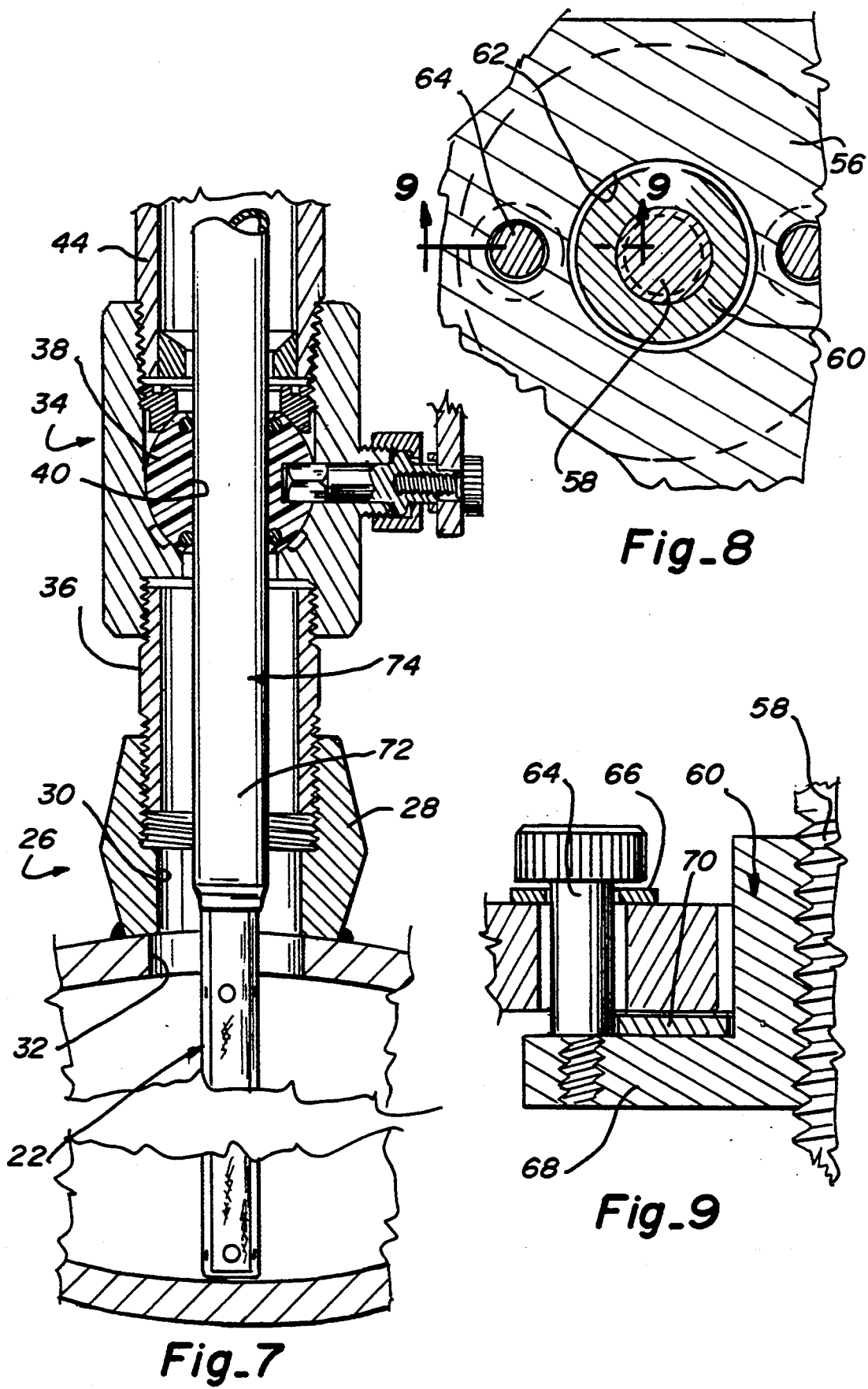

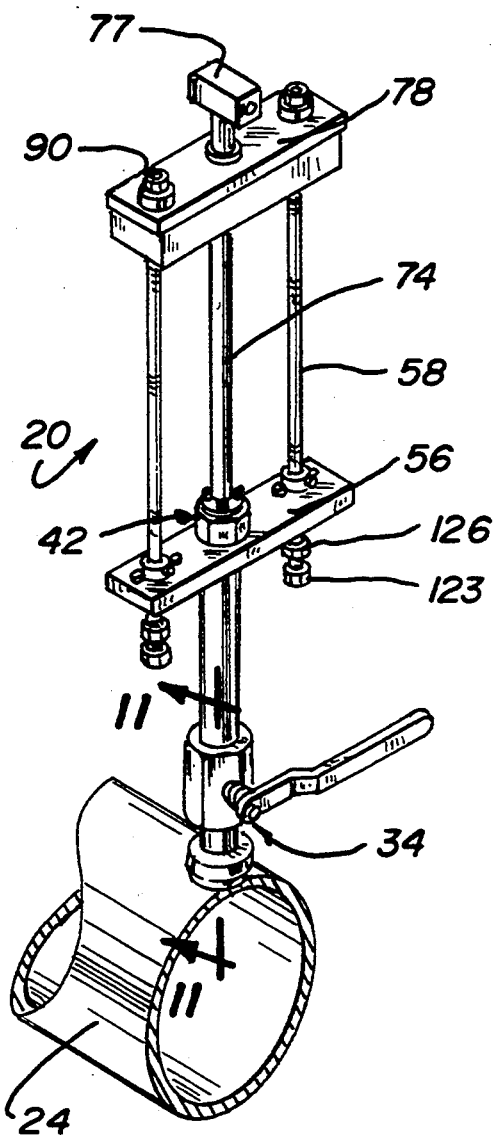
Fig_10
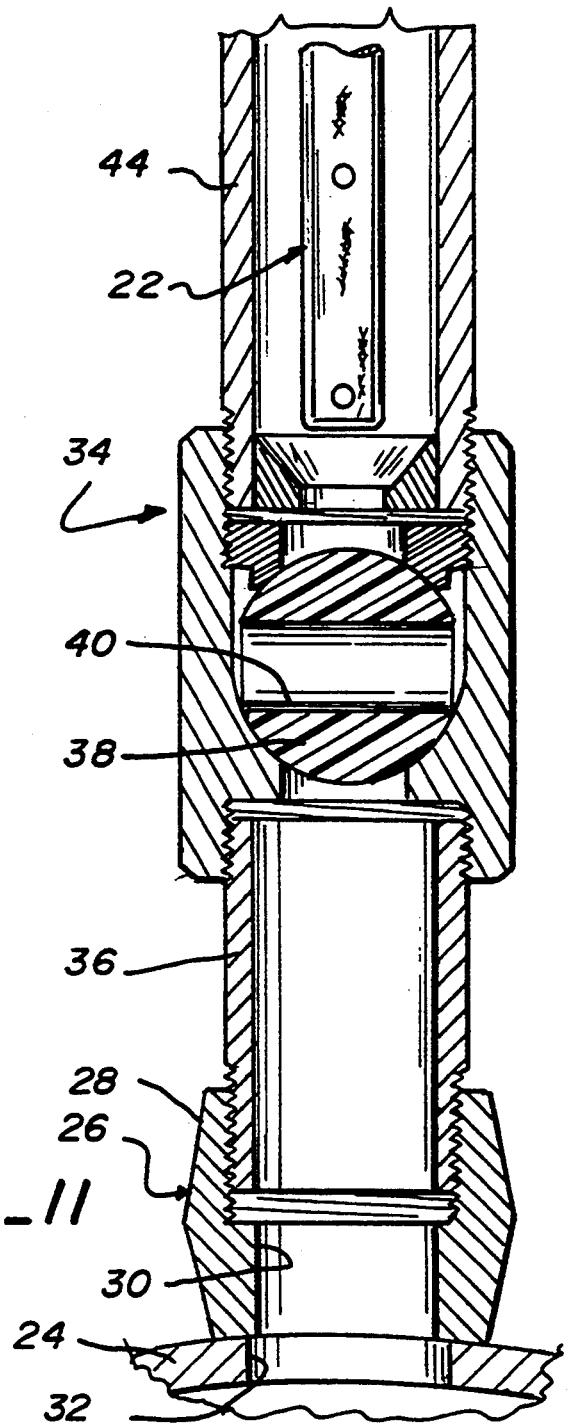
Fig_11

APPARATUS FOR INSERTING AND REMOVING A SENSING ELEMENT FROM A FLUID PIPELINE

BACKGROUND OF THE INVENTION

1. Field of the Invention

The present invention relates generally to tools for inserting and removing sensors such as pitot tubes into and from fluid conveying pipelines. More particularly, the present invention relates to a tool or apparatus for inserting and removing a sensor through a hot tap in a high pressure pipeline without interrupting the flow of fluid in the pipeline.

2. Description of the Prior Art

In fluid conveying pipelines, such as gas, water, or petrochemical pipelines, it is often desirable to collect information about the flow rate, pressure, or other parameters of fluid flowing in the pipeline by insertion of a measuring device such as a pitot tube, hereinafter sometimes referred to generally as a sensor, into the flowing fluid. For example, in order to measure flow, an elongated flow-sensor, such as the pitot tube described in U.S. Pat. No. 5,036,711, may be inserted into the flow. It is also desirable to insert and remove sensors from the pipeline while the fluid is present and flowing therein. This facilitates moving sensors from location to location, when it is desired to measure the characteristics of the fluid only periodically, and facilitates removal of the sensor for maintenance, cleaning and subsequent re-insertion.

In order to accomplish insertion and removal without interrupting flow, an arrangement known as a hot tap is widely used. A hot tap generally comprises a coupling through a wall of the fluid pipeline and an access valve connected to the outlet. The access valve is of a type which provides an unobstructed access passageway to the interior of the pipeline when the valve is open. The valve is connected by an access tube to a packing gland designed to seal around the sensor while permitting the sensor to be inserted and removed through the gland, tube, and valve.

Many problems are inherent in inserting and removing a sensor through a hot tap in a fluid pipeline. The pressure of the fluid within the pipeline may be extremely high, creating a substantial force resisting insertion of the sensor. In addition, the sensor is typically long and slender, making it difficult to handled and creating the possibility of binding at the packing gland and damaging the sensor if it is not inserted or removed substantially along a longitudinal axis of the access tube. Accordingly it is necessary to substantially align the sensor with the longitudinal axis of the access tube before inserting the sensor into the packing gland. This requires an unobstructed insertion space between the packing gland and the nearest obstruction, such as another pipe, a wall, or a ceiling, the insertion space being at least as long as the sensor and valve height. Such insertion and removal tools increase the required insertion spaced making it difficult to use in restricted spaces.

Several insertion and removal tools have been used to partially overcome these problems. Piston-driven hydraulic tools have been used to apply an insertion force through a drive rod to the top of the sensor, pushing the sensor into the pipeline. These tools can provide sufficient force but are mechanically complex, and thus prone to failure. In addition, since they must be aligned with the longitudinal axis of the sensor, these tools substantially add to the required insertion space.

Direct insertion tools using threaded stem and nut constructions have also been used. These tools are secured to the top of the sensor and provide a mechanical advantage for manual insertion, thus helping to overcome the high pressure of the fluid pipeline and being mechanically simpler than the hydraulic insertion devices. However, these tools share the disadvantage of requiring additional insertion space. Single and dual drive rod systems which pull the top of the sensor toward the access valve and the fluid pipeline have also been used An example of a single drive rod system is disclosed in U.S. patent application Ser. No. 07/850,760, assigned to the assignee of the present invention. However, such a single drive rod system may not provide sufficient force in a high-pressure pipeline situation. Thus, dual drive rod systems have been developed with a first plate operatively connected to the packing gland or access tube and a second plate operatively connected to the sensor. A pair of externally-threaded drive rods link the two plates. As each of the drive rods is rotated, the two plates are pulled together. An illustrative dual drive rod system is manufactured by Dieterich Standard, Product No. DHF-25-GH6SA.

There are, however, many drawbacks to such a dual drive system. First, insertion and removal with this system is slow because each of the two drive rods are rotated separately. As the first and then the second drive rod are alternately rotated, bending moments are caused through the tool. Bending moments may affect the sensor by damaging it or causing it to hang up in the access tube, valve or at the pipe wall. In addition, by placing the sensor in a position that is not perpendicular to the flow of fluid, inaccurate measurements may be obtained. Second, the bending moments may be translated to the drive rods causing galling of their threads. Third, the bending moments cause greater friction at the packing gland thereby increasing the force required to insert the sensor. In addition, with this alternating operation of the drive rods, each drive rod is alternately placed in a position of bearing the entire load and twisting due to the applied torque, thus defeating the purpose of a dual drive rod system.

Worm gear dual drive rod systems which rotate a threaded hub around a fixed threaded rod have been developed to eliminate some of these problems. Such systems include a crank and worm gear which mates with drive gears and gear boxes associated with each of the drive shafts in a conventional fashion. However, these systems require critical alignment between the drive shaft, worm gears, drive gears and gear boxes. In addition, the "timing" of drive gears is extremely difficult since a worm gear apparatus offers little allowance for gear backlash and misalignment. These misalignment problems are further enhanced by the fact that threaded drive rods of appreciable length have relatively large tolerances on concentricity, straightness and bow.

A dual drive rod apparatus is disclosed in U.S. Pat. No. 5,009,113. The pair of threaded drive rods operatively interconnect a measuring means and a valve so as to allow the measuring means to alternatively be driven toward or away from the valve. A combination of a crank, a pair of cogged wheels, and a cogged belt is used to rotate a pair of threaded bushings attached to the measuring means and each engaging with one of the stationary drive rods. This apparatus suffers from the disadvantage of having no free play to accommodate drive rods which are not straight.

An additional problem associated with all single and dual drive rod apparatus is the inability of the user to know when the sensor is in the proper position in the pipe. This can result in inaccurate measurements if the sensor is not inserted far enough into the pipeline. Furthermore, systems such as the worm gear type described above have an enormous mechanical advantage which makes it possible to unknowingly drive the sensor into the opposite wall of the fluid pipeline, thus causing damage to the sensor or rupture of the pipeline.

It is against this background and prior art that the present invention has been developed to provide an improved apparatus for inserting and removing sensors.

OBJECTS OF THE INVENTION

The principal object of the present invention is to provide an improved insertion and removal apparatus for inserting sensors into pipelines in which the insertion and retraction will be relatively easier and quicker than prior devices.

Another object of the present invention is to provide an insertion and removal apparatus of the foregoing character which maintains the axial alignment and reduces the bending moments and torque of the apparatus and of the sensor so as to reduce thread galling, bending hang up or damage to the components and provide for more accurate measurements.

A further object of the present invention is to provide an insertion and removal apparatus of the above character for inserting sensors with dual rotating drive rods with a more convenient and efficient synchronization thereof.

It is still another object of the present invention to provide an improved dual drive rod system of the foregoing type in which there is increased allowance for variation in drive rod concentricity, straightness and bow.

It is yet another object of the present invention to provide an improved sensor insertion apparatus capable of correct positioning of the sensor within the fluid pipeline and loading of the sensor on the opposite wall.

SUMMARY OF THE INVENTION

The pipeline sensor inserting tool of the present invention includes a seal secured to the pipeline for receiving the sensor, a mounting plate operatively connected to the seal, a sensor plate extending parallel to the mounting plate and connected to the sensors a pair of drive rods interconnecting the sensor plate and the mounting plate to move the plates to or from each other when the rods are rotated, a sprocket on each drive rod and an interconnecting chain between the sprockets which causes corresponding rotation of a drive rod in response to rotation of the opposite drive rod.

Another aspect of the improved inserting tool of the present invention includes an access tube operatively attached to the pipeline, a cylindrical sensor tube received by and extending through the access tube, a driving means interconnecting the access tube and sensor tube for extending and withdrawing the sensor tube including a pair of parallel drive rods, a mounting plate secured to the access tube, and threaded sleeves mounted in the mounting plate for receiving the drive rods and yieldingly moving a slight amount to accommodate variations in the drive rods.

Another aspect of the improved tool of the present invention includes an access tube operatively attached to the pipeline, a cylindrical sensor tube received by and extending through the access tube, a driving means interconnecting the access tube and sensor tube for extending and withdrawing the sensor tube including a pair of drive rods, a sensor plate secured to the sensor tube and operatively connected to the drive rods, and a force indication means located on the drive rods to indicate the force encountered by the sensor tube.

Another aspect of the improved tool of the present invention includes an access tube operatively attached to the pipeline, a cylindrical sensor tube received by and extending through the access tube, a driving means interconnecting the access tube and sensor tube for extending and withdrawing the sensor tube including a pair of drive rods, a sensor plate for receiving the drive rods and sensor tube and a sensor tube bushing mounted on said sensor plate for mounting to the sensor tube.

A more complete understanding and appreciation of the present invention can be obtained by reference to the accompanying drawings, which are briefly described below, from the following description of the presently preferred embodiment and from the appended claims.

DESCRIPTION OF THE DRAWINGS

FIG. 1 is an isometric view of an insertion and removal apparatus embodying the present invention shown installed with a hot tap and sensor in a fluid pipeline.

FIG. 2 is a partial section taken along line 2—2 of FIG. 1.

FIG. 3 is a section taken along line 3—3 of FIG. 2.
FIG. 4 is a section taken along line 4—4 of FIG. 2.
FIG. 5 is a section taken along line 5—5 of FIG. 1.
FIG. 6 is a section taken along line 6—6 of FIG. 2.
FIG. 7 is a section taken along line 7—7 of FIG. 2.
FIG. 8 is a section taken along line 8—8 of FIG. 5.
FIG. 9 is a section taken along line 9—9 of FIG. 8.
FIG. 10 is an isometric view of the insertion and removal apparatus of the present invention shown in a retracted position with the sensor out of the fluid pipeline and with the access valve in a closed position.

FIG. 11 is a section taken along line 11—11 of FIG. 10.

DESCRIPTION OF THE PREFERRED EMBODIMENT

The present invention is embodied in an inserting apparatus 20 for inserting a sensor 22 into a fluid pipeline 24 (FIG. 1). The pipeline 24 conventionally includes a hot tap 26 (FIGS. 2, 7 and 11) formed by an internally threaded or otherwise connected coupling 28 welded to the external surface of the fluid pipeline and defining a bore 30 opening through an aperture 32 provided in the fluid pipeline. An access valve 34 is secured to the coupling by a nipple 36. The access valve is of a conventional type having a selectively rotatable ball 38, or otherwise method of fluid isolation, defining a bore 40 therethrough.

A packing gland 42 (FIG. 6) for sealingly engaging a sensor 22 is secured to the access valve 34 by an access tube or pipe nipple 44 defining an inner bore 45 (FIGS. 6 and 7) The packing gland assembly shown in FIG. 6 is of a conventional type and includes a packing sleeve 46 connected to a retaining body 50 by a plurality of bolts 52. Packing 54 is compressed between the packing sleeve and the retaining body 50 so as to seal against the sensor and prevent fluid flow therealong. The access tube 44 is secured at its first end 44a to the access valve 34 (FIG. 7) and is secured at its second end 44b to the packing gland 42 (FIG. 6).

For purposes of driving the sensor 22 through the packing gland 42 into the pipeline 24, a rectangular mounting plate 56 (FIGS. 2 and 6) is secured by welding to the retaining body 50 of the packing gland 52. Suitable provisions are provided at either end edge of the mounting plate 56 for mounting of a pair of elongateds externally-threaded drive rods 58 (FIGS. 2 and 5). In the embodiment shown, the mounting of the driver rods 58 to the mounting plate 56 is provided by a pair of internally-threaded sleeves 60, each one located in a separate one of oversized bores 62 defined at either end of the mounting plate. As shown in FIG. 5, the threaded sleeves are slidably received within the bores 62 and secured by shoulder bolts 64 passed through thrust washers 66 and the mounting plate to mate with threaded bores defined within a flange 68 on the threaded sleeve. A washer 70 is located between the neck of the threaded sleeve and the mounting plate. Because the length of the shank of the bolt is greater than the combined height of the thrust washer, mounting plate, and washer, and because the bore 62 is oversized as compared to the external diameter of the threaded sleeve, the threaded sleeve is moveable axially, laterally and radially within the oversized bore as may be necessary to accommodate irregularities in the threaded drive rods 58 and assure parallel alignment.

For purposes of connecting the sensor 22 to the threaded drive rods 58, the sensor is mounted to extend longitudinally from a first end 72 of a sensor tube 74, as shown in FIG. 7 At a second end 76 of the sensor tube (FIG. 2) is located an instrument head 77 for connection of the sensor to auxiliary sensing equipment (not shown). Near this second end, the sensor tube is secured to a rectangular sensor plate 78. To this end, the sensor tube is secured by welding to the top surface of a sensor tube bushing 79 which passes through a bore 80 defined in the sensor plate. The bushing in turn is secured to the sensor plate by welding it to the bottom end of the plate.

The sensor plate 78 is sized and shaped to correspond generally with the mounting plate 56. The threaded drive rods 58 are journaled (FIG. 4) in a pair of spaced apart sensor plate bushings 82 located in bores 83 defined in the sensor plate. Each sensor plate bushing has a flange 84 which is supported on top of the sensor plate and a neck 86 which extends through the bore of the sensor plate and is welded to a bottom side 88 thereof. Each threaded drive rod 58 is supported on its associated bushing 82 by a drive nut 90 threadedly engaged with and pinned to the rod above the sensor plate.

For rotating the drive rods in unison, an internally-threaded sprocket 92 is secured to each rod below the sensor plate and the sprockets are drivingly connected by a chain 110. By rotating one drive rod, the other is correspondingly driven.

Each sprocket is secured to the drive rod by a roll or dowel pin 98. A first thrust bearing washer 100 is positioned between the sprocket and the sensor plate bushing and a second thrust bearing washer 102 is positioned between the sensor plate bushing and the drive nut, A load indicator 104 is located between the second thrust bearing washer 102 and the drive nut 90 on each drive rod 58 to provide an indication of the load on the sensor. The load indicator includes a plurality of Belleville or spring washers 106, preferably two, which can be flattened when sufficient force is applied to them.

The sprocket and chain are protected from dust and debris by a shroud 112 in the form of a rectangular box open on a top side and held against the bottom of the sensor plate 78 by an internally-threaded shroud nut 114 pinned to the drive rod 58. A shroud retaining bearing 118 passes through the shroud via an aperture 120 defined therein and slidably receives the drive rod above the shroud nut 114.

To limit upward movement or retraction of the sensor 22, a stop nut 123 is pinned to the lower end of each drive rod. For further limiting retraction of the sensor after it is bottomed on the opposite pipeline wall, a jam nut 126 (FIG. 10) is adjustably located on the drive rod at a preselected distance between the stop nut and the internally threaded sleeve 60.

In operation, the apparatus 20 is mounted on the access valve 34 by engaging the nipple 44 with the valve. The valve is then opened and the sensor 22 and the sensor tube 74 are fed through the valve into the fluid pipeline 24 by turning the drive nut 90 located on either of the drive rods 58. Rotation of either drive rod will result in a corresponding rotation of the opposite drive rod, thereby maintaining the sensor plate 78 and mounting plate 56 substantially parallel to each other. This maintains the sensor tube perpendicular to the mounting plate, parallel to the pipe nipple 44 and opening in the access valve 34 and nipple 36, so that it extends perpendicularly into the pipeline 24.

As one or the other of the drive nuts 90 is turned, it causes its respective drive rod 58 to rotate and thereby the sprocket 92 and the chain 110 which rotates the opposite drive rod. At the same time, the rotating threaded drive rods move longitudinally through their respective threaded sleeves 60 on the stationary mounting plate 56. The moving drive rods carry the sensor plate 78 which supports the sensor tube 74 thereby feeding the sensor tube through the packing gland 42, the pipe nipple 44, the access valve 34 and nipple 36 and into the pipeline.

If, for some reason, the sensor 22 and/or sensor tube 74 encounter a greater than expected amount of force, the sensor plate 78 will exert an upward force against the load indicators 104 on the drive rods 58 which can indicate to the operator this condition. This may occur because the tip of the sensor has reached the opposite side or wall of the fluid pipeline 24 or because there is some type of obstruction or other problem. The operator can then appropriately respond to this indication of increased load against the sensor. If the load indicator on one drive rod indicates an increased load while the load indicator on the other rod does not, this can indicate to the operator a problem with the operation of the apparatus 20.

Additionally, when the load indicators 104 are flattened they exert a precise predetermined load on the sensor 22 and wall of the pipeline 24. This reduces the possibility of bending or breaking the sensor or damaging the pipeline due to excessive loading or breakage of the sensor if it becomes detached from the pipeline wall because of insufficient load. Further, the springs 106 of the load indicators maintain a predetermined load on the sensor and pipeline wall after the pipeline has been pressurized and undergone dimensional changes due to pressure, temperature or mechanical force.

The advantages of the present invention are as follows. The sensor 22 may be inserted and retracted in a relatively easier and quicker fashion as the user is only required to turn either one of the two drive nuts 90°. Since the sensor plate 78 remains parallel to the mounting plate 56 and perpendicular to the sensor which is perpendicularly inserted into the pipeline, the bending moments throughout the tool, sensor and valve are greatly reduced. The reduction in bending moments decreases the wear and failure of the mechanical components of the tool, decreases the risk of rupture which would result in loss of fluid and increases the measurement accuracy.

Greater fluid force load pressures are possible as both drive rods carry fluid force loads equally, instead of each rod alternately carrying the entire load. In addition, the chain and sprocket arrangement and the laterally and radially sliding threaded sleeves allow for variations in drive rod concentricity, straightness and bow. Further, the load indicators apply a precise predetermined load on the sensor and pipeline wall which helps to reduce the danger of rupturing the pipeline or damaging the sensor.

Although the present invention has been described with a certain degree of particularity, it is understood that the present disclosure has been made by way of example, and changes in detail or structure may be made without departing from the spirit of the invention, as defined in the appended claims.

The invention claimed is:

1. An apparatus for inserting and withdrawing a sensor into a fluid conveying pipeline through an access valve connected by a coupling to said pipeline providing an unobstructed opening therethrough into said pipeline when the valve is in an open position, said apparatus comprising in, in combination,
    an elongated access tube having first and second ends and defining an inner bore, said tube connected at its first end to said access valve, a packing gland connected to said access tube at its second end and adapted for sealing against a cylindrical member inserted therein;
    an elongated cylindrical sensor tube housing said sensor with said sensor extending from one end thereof, said sensor tube slidably extending coaxially through said access tube and said packing gland;
    a pair of spaced apart parallel threaded rotatable drive rods each operatively connected between said access tube and said sensor tube;
    a mounting plate secured to said access tube and defining first and second openings therethrough for receiving said drive rods; and
    a threaded sleeve loosely mounted in each of said openings and each receiving one of said drive rods, each threaded sleeve being movable within said opening to accommodate variations in alignment of said drive rods.

2. An apparatus as defined in claim 1 wherein said first and second openings in the mounting plate are circular in cross-section and of a predetermined diameter, and further wherein said threaded sleeves are cylindrical and of a predetermined diameter which is relatively smaller than the diameter of the circular openings.

3. An apparatus for inserting a sensor into a fluid conveying pipeline through an access valve connected by a coupling to said pipeline and providing an unobstructed opening therethrough into said pipeline when the valve is in an open position, said apparatus comprising, in combination,
    an elongated access tube having first and second ends and defining an inner bore, said tube connected at its first end to said access valve, a packing gland connected to said access tube at its second end and adapted for sealing against a cylindrical member inserted therein;
    an elongated cylindrical sensor tube, housing said sensor with said sensor extending from one end thereof, said sensor tube slidably extending coaxially through said access tube and said packing gland;
    a pair of spaced apart parallel threaded rotatable drive rods each operatively connected between said access tube and said sensor tube;
    a sensor plate secured to said sensor tube and defining first and second openings therethrough for receiving said drive rods; and
    means on each said drive rod adjacent to said sensor plate operative to indicate the force encountered by the sensor tube in a direction tending to prevent further extension of said sensor tube through said access tube, whereby the likelihood of damage to said pipeline and sensor is reduced.

4. An apparatus as defined in claim 3 wherein said driving means includes a drive nut secured on the end of each rod adjacent said sensor plate and said force indicating means comprises a load indicator retained on said drive rod between said sensor plate and said drive nut.

5. An apparatus as defined in claim 4 wherein said load indicator includes one or more spring washers.

6. An apparatus for inserting and withdrawing a sensor into a fluid conveying pipeline through an access valve connected by a coupling to said pipeline and providing an unobstructed opening therethrough into said pipeline when the valve is in an open position, said apparatus comprising, in combination,
    an elongated access tube having first and second ends and defining an inner bore, said tube connected at its first end to said access valve, a packing gland connected to said access tube at its second end and adapted for sealing against a cylindrical member inserted therein;
    an elongated cylindrical sensor tube, housing said sensor with said sensor extending from one end thereof, said sensor tube slidably extending coaxially through said access tube and said packing gland;
    a pair of spaced apart parallel threaded rotatable drive rods each operatively connected between said access tube and said sensor tube;
    a sensor plate secured to said sensor tube and defining first and second openings therethrough for receiving said drive rods; and
    means on each said drive rod adjacent to said sensor plate operative to maintain a constant load on said sensor tube when said tube engages the pipeline wall.

7. An apparatus as defined in claim 6 wherein said driving means includes a drive nut secured on the end of each rod adjacent said sensor plate and said load maintaining means comprises a load indicator retained on said drive rod between said sensor plate and said drive nut.

8. An apparatus as defined in claim 7 wherein said load indicator includes one or more spring washers.

9. An apparatus for inserting and withdrawing a sensor into a fluid conveying pipeline through an access valve connected by a coupling to said pipeline and providing an unobstructed opening therethrough into said pipeline when the valve is in an open position, said apparatus comprising, in combination.
- a seal secured to said valve for slidingly and sealingly receiving said sensor;
- a mounting plate connected to said valve;
- a sensor plate operatively connected to said sensor and extending generally parallel to said mounting plate;
- a pair of threaded drive rods;
- threaded bushings mounted in spaced relation on said mounting plate and threadably receiving said drive rods, spaced apart bushings journaling said drive rods on said sensor plate for longitudinal movement therewith.
- a sprocket drivingly secured on each of said drive rods adjacent said journal bushings;
- a chain engagingly interconnecting said sprockets; and
- a drive nut affixed to either one of said drive rods so that rotation of said drive nut causes rotation of said one drive rod and corresponding rotation of the other drive rod to drive said sensor plate towards or away from said mounting plate thereby to accurately position said sensor in said pipeline.

10. An apparatus as defined in claim 9, further comprising:
- a shroud connected to said drive rods for enclosing the sprocket on each drive rod and the chain operatively interconnecting the sprockets.

11. An apparatus as defined in claim 9 further comprising:
- a stop nut affixed to an end of at least one of the pair of drive rods, said stop nut being on the opposite side of the mounting plate from the sensor plate; and
- an internally-threaded jam nut located on and engaging with said one drive rod, said jam nut being rotatably adjustable to a range of positions along the drive rod between said stop nut and said sleeve.

12. An apparatus for inserting and withdrawing a sensor into a fluid conveying pipeline through an access valve connected by a coupling to said pipeline and providing an unobstructed opening therethrough into said pipeline when the valve is in an open position, said apparatus comprising, in combination.
- an elongated access tube having first and second ends defining an inner bore, said tube connected at its first end to said access valve, a packing gland connected to said access tube at its second end and adapted for sealing against a cylindrical member inserted therein;
- an elongated cylindrical sensor tube housing said sensor with said sensor extending from one end thereof, said sensor tube slidably extending coaxially through said access tube and said packing gland;
- a pair of spaced apart parallel threaded rotatable drive rods each operatively connected between said access tube and said sensor tube;
- a mounting plate connected to said access tube adjacent to said second end and defining first and second openings therethrough for receiving said drive rods;
- a threaded sleeve loosely mounted in each of said first and second openings in the mounting plate and receiving one of said drive rods, each threaded sleeve being movable within said opening to accommodate variations in alignment of said drive rods and wherein said first and second openings in said mounting plate are circular and of a predetermined diameter and further wherein said threaded sleeves are cylindrical and of a predetermined diameter which is relatively smaller than that of said circular openings;
- a sensor plate operatively connected to said sensor tube and extending generally parallel to said mounting plate and defining first and second openings therethrough for receiving said drive rods and defining a third opening therethrough for receiving the sensor tube;
- a sensor plate bushing extending through one of the first or second openings of the sensor plate and affixed to the sensor plate, wherein the bushing receives one of the drive rods therethrough, the drive rod being freely rotatable within the bushing and longitudinally fixed within the bushing;
- a sensor tube bushing positioned in said third opening and receiving said sensor tube, whereby bending moments are better distributed to the sensor plate, said sensor tube bushing including a cylindrical neck extending through said third opening in said sensor plate and further including a first and second shoulder on alternate sides of said neck to retain said bushing within said third opening in said sensor plate and said bushing being I-shaped in cross section;
- a stop nut affixed to an end of one of the pair of drive rods, said stop nut being on the opposite side of the mounting plate from said sensor plate;
- an internally-threaded jam nut located on and engaging with said one of said pair of drive rods, said jam nut being rotatably adjustable to a range of positions along said drive rod between said stop nut and said sleeve;
- a sprocket on each of said drive rods;
- a chain engagingly interconnecting said sprockets whereby rotation of either drive rod causes corresponding rotation of the other drive rod to drive said sensor plate to accurately position said sensor in said pipeline;
- a shroud operatively connected to each drive rod for enclosing said sprockets and said chain operatively interconnecting said sprockets;
- a drive nut affixed to one of said drive rods on an end adjacent to said sensor plate so that rotation of said drive nut causes rotation of said one drive rod and corresponding rotation of the other drive rod; and
- a load indicator including at least one or more spring washers located on one drive rod adjacent to said sensor plate and retained between the sensor plate and said drive nut for indicating the force encountered by said sensor tube in a direction tending to prevent further extension of said sensor tube through said access tube, whereby the likelihood of damage to said pipeline and sensor is reduced; and
- wherein the drive rod is longitudinally retained within the bushing by the drive nut and sprocket which are each affixed to the drive rod on alternate ends of the bushing.

* * * * *